United States Patent [19]

Waldmeier

[11] 4,428,465
[45] Jan. 31, 1984

[54] CONDUCTOR STRIP HOUSING FOR A CONDUCTOR RAIL

[76] Inventor: Hughes E. Waldmeier, 30, Rue d'Ottmarsheim, 68170 Rixheim, France

[21] Appl. No.: 263,858
[22] Filed: May 15, 1981

[30] Foreign Application Priority Data

May 20, 1980 [CH] Switzerland .................. 3941/80

[51] Int. Cl.³ .............................................. B60M 1/34
[52] U.S. Cl. .............................. 191/23 A; 339/22 T; 191/30
[58] Field of Search .................... 339/21 S, 22 T; 191/23 A, 25, 30

[56] References Cited

U.S. PATENT DOCUMENTS

| | | | |
|---|---|---|---|
| 2,278,761 | 4/1942 | Benbow | 191/30 |
| 3,590,173 | 6/1971 | Stahmer | 191/23 A |
| 3,985,211 | 10/1976 | Bommart | 191/23 A |
| 4,022,967 | 5/1977 | Bulanchuk | 191/23 A |

Primary Examiner—Richard A. Schacher
Attorney, Agent, or Firm—McGlew and Tuttle

[57] ABSTRACT

There is disclosed an elongate housing member of insulating material defining a downwardly open interior space for reception of a conductor strip so as to form an electric current conductor rail with the strip, the housing member being provided at each of two opposite sides thereof with a respective longitudinally extending rib. The ribs are arranged and constructed in such a manner that the housing member can be connected to a further such housing member at substantially the same height. One of the ribs is provided at its underside with a groove and the other rib with an upwardly projecting bead, the groove and bead having substantially the same cross-sectional shape.

6 Claims, 1 Drawing Figure

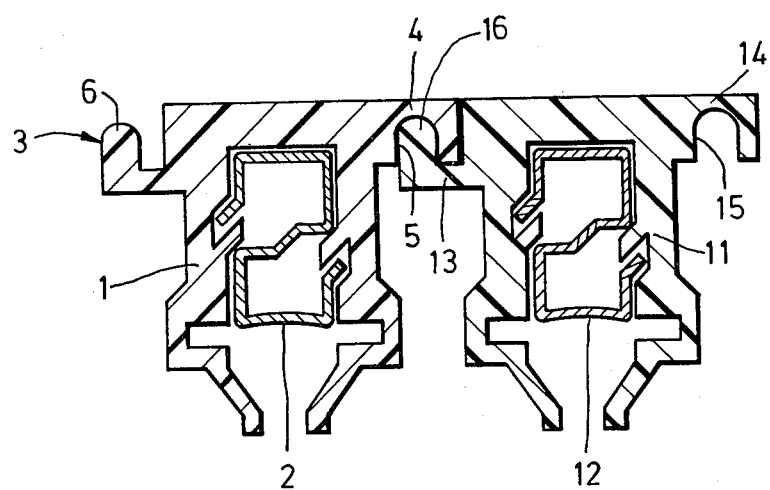

CONDUCTOR STRIP HOUSING FOR A CONDUCTOR RAIL

BACKGROUND OF THE INVENTION

The present invention relates to a housing member for receiving a conductor strip so as to form with such strip an electric current conductor rail and to an assembly of such housing members.

Hitherto, such housing members have been individually fastened to carriers and at a spacing from each other which, although theoretically dependent on the spacing from each other of current pick-ups of a vehicle drawing current from a conductor rail incorporating the housing member, in practice was very often dependent on the accuracy of the work of the fitter. Moreover, a very secure fastening of the individual housing members was always necessary to prevent lateral displacement relative to each other.

OBJECTS OF THE PRESENT INVENTION

It is therefore the principal object of the present invention to provide a housing member for a conductor strip, which housing member is provided with means whereby it can be easily and quickly located relative to another such housing member so that the members are disposed in a predetermined relationship, in particular so that the members may have a constant lateral spacing and a constant vertical relationship.

Other objects and advantages of the invention will be apparent from the following description.

SUMMARY OF THE INVENTION

According to one aspect of the present invention there is provided an elongate housing member of electrically insulating material defining a downwardly open interior space for reception of a conductor strip so as to form with the strip an electric current conductor rail. The housing member is provided at each of two opposite sides thereof with an external connecting rib which extends along the housing member. These ribs are so constructed and arranged that the housing member can be connected to another such housing member in such a manner that the interconnected housing members are disposed at substantially the same height.

For preference, the rib at one side of the housing member is flush with a horizontal upper surface of the housing member and is provided at its underside with a groove, while the rib at the other side of the housing member has a bead having a cross-section adapted to that of the groove. The two ribs preferably extend for substantially the same distance from the central vertical plane of the interior space of the housing member.

According to another aspect of the present invention there is provided an electric current conductor rail assembly comprising two interconnected housing members of the kind referred to above and two conductor strips each received in a respective one of the interior spaces of the housing members. The housing members are located relative to each other by the ribs at mutually facing sides thereof so as to be disposed at substantially the same height, the rib bead of one of the housing members being engaged in the rib groove of the housing member.

BRIEF DESCRIPTION OF THE DRAWING

An embodiment of the present invention will now be more particularly described by way of example and with reference to the accompanying drawing, which is a cross-section of a current conductor rail assembly composed of two interconnected housing members and two conductor strips respectively arranged therein, the two housing members extending parallel to each other.

DESCRIPTION OF THE PREFERRED EMBODIMENT

Referring now to the accompanying drawing, there is shown an electric current conductor rail assembly for current conduction to the current pick-ups of an electrically powered vehicle, for example a rail engine, the assembly consisting of two conductor rails conjoined in a spatial relationship predetermined to correspond to that of the current pick-ups.

The lefthand conductor rail consists of an elongate housing member 1 of electrically insulating material and a metallic conductor strip 2 of approximately Z-shaped cross-section.

The housing member 1 in cross-section has substantially the shape of a rectangular box, which defines a downwardly open interior space and is provided with a respective external rib at each of two opposite lateral sides of the member, the ribs being formed integrally with the box walls and extending longitudinally of the member. The rib at the lefthand side of the member is designated by 3, and that at the righthand side by 4. The rib 4 is flush with the horizontal upper external surface of the housing member and is provided at its underside with a groove 5. The rib 3 at the other side of the housing member is provided with a bead 6 having a cross-section adapted to that of the groove 5. Both ribs extend substantially equal distances from the central plane of the interior space.

The righthand conductor rail is constructed in exactly the same manner as the aforedescribed lefthand conductor rail and its parts corresponding to the parts 1 to 6 of the lefthand rail are designated by the reference numerals 11 to 16. As can be seen from the drawing, the bead 16 fits exactly into the groove 5 so that the two conductor rails can be hooked together. This substantially facilitates assembly of the rails, because either rail can without any difficulty be brought into a defined and previously determined position relative to its neighbouring rail and because the two rails mutually interengage.

I claim:

1. An elongate housing member of electrically insulating material defining a downwardly open interior space for reception of a conductor strip so as to form with said strip an electric current conductor rail, said housing member being provided at each of two opposite sides thereof with a respective external connecting rib extending longitudinally of said member, said ribs being so constructed and arranged that said housing member is connectible to a further such housing member in such a manner that said interconnected housing members are disposed at substantially the same height, one of said ribs of said housing member being provided with means defining a groove in its underside and the other one of said ribs being provided with means defining a head at its upper side, the cross-section of said head corresponding to that of said groove.

2. A housing member according to claim 1 wherein said ribs extend outwardly from said housing member to terminate at substantially equal distances from a central longitudinal plane of said housing member bisecting said interior space.

3. A housing member according to claim 2, wherein said housing member includes a horizontal upper external surface extending over said one of said ribs whereby a plurality of interconnected housing members have connected and substantially uninterrupted horizontal upper external surfaces lying in a common plane.

4. An electric current conductor rail assembly comprising two interconnected elongate housing members of electrically insulating material each defining a downwardly open interior space, and two conductor strips each received in a respective one of said interior spaces, each of said housing members being provided at each of two opposite sides thereof with a respective external connecting rib extending longitudinally of the associated one of said members, said ribs being so constructed and arranged as to locate said housing members relative to each other at substantially the same height, one of said ribs of each of said housing members being provided with means defining a groove in its underside and the other one of said ribs of each of said housing members being provided with means defining a rib at its upper side, the head of said one rib of one of said housing members being engaged in the groove of said other rib of the other of said housing members thereby to locate said housing members relative to each other.

5. A conductor rail assembly according to claim 4, wherein said ribs of each of said housing members extend to terminate at substantially equal distances from a central longitudinal plane of the associated housing member bisecting said interior space thereof.

6. A conductor rail assembly according to claim 5, wherein each of said housing members includes a horizontal upper surface extending over said one of said ribs of each housing member, the horizontal upper surface of said housing members being connected and uninterrupted between said housing members and in a common plane.

* * * * *